METHOD OF PREPARING PRINTING PLATES

Filed Oct. 7, 1964

INVENTORS
JOHN P. St. CLAIR
MYLON MERRIAM
EDWARD L. CHAMBERS
CLYDE A. CLARK
WILLIAM H. FISCHER, Jr.
ROBERT J. HOUSTON

BY Joseph A. Hill
ATTORNEY

Nov. 26, 1968 J. P. ST. CLAIR ETAL 3,413,119

METHOD OF PREPARING PRINTING PLATES

Filed Oct. 7, 1964 2 Sheets-Sheet 2

*INVENTORS*

JOHN P. St.CLAIR
MYLON MERRIAM
EDWARD L. CHAMBERS
CLYDE A. CLARK
WILLIAM H. FISCHER, Jr.
ROBERT J. HOUSTON

BY Joseph A. Hill

ATTORNEY

United States Patent Office 3,413,119
Patented Nov. 26, 1968

3,413,119

METHOD OF PREPARING PRINTING PLATES

John P. St. Clair, Olney, Md., Mylon Merriam, Washington, D.C., Edward L. Chambers, Rockville, Md., Clyde A. Clark, Vienna, Va., and William H. Fischer, Jr., and Robert J. Houston, Silver Spring, Md.; said Merriam, said Chambers, said Clark, said Fischer, and said Houston, assignors to the United States of America as represented by the Secretary of the Army Filed Oct. 7, 1964, Ser. No. 402,364
5 Claims. (Cl. 96—33)

ABSTRACT OF THE DISCLOSURE

This invention relates to printing, and more specifically to improved methods for preparing printing plates to reproduce continuous-tone copy. The method includes the use of a continuous tone film negative and a continuous tone film positive registered in back to back relationship, the positive being developed with a different density than the negative. Lithographic film is then exposed directly through the registered negative and positive producing upon development irregular, shaped and spaced black granules on cleared areas of film base.

This invention may be used by or for the Government for governmental purposes without the payment to us of any royalty thereon.

Background of the invention

FIELD OF THE INVENTION

This invention is a process for producing extremely detailed printing plates from lithographic film exposed through a negative and positive in registered relationship.

DESCRIPTION OF THE PRIOR ART

It is well known that continuous-tone printing plates are unsuitable for use in reproductive processes such as offset lithography. The lithographic printing process requires the tone of the printing plate to be broken up into a pattern of dark areas or dots which vary in size to give the effect of shadows or highlights in the printed reproduction. During the printing process, only the dots receive the grease and later the printing ink. For many years it has been conventional to break up the continuous-tone of the negative to be printed by exposing through a fine screen which breaks the tone areas of the negative into a regularly-spaced pattern of minute dots. The finer the screen, the higher the quality of the printing. This method is known as halftone reproduction.

Although the halftone process has been widely used commercially, it is not without its disadvantages. The screens used in the process are expensive and difficult to produce; the reproduction tends to have a mechanical appearance due to the regularity of the dot pattern; the lines between shadow and highlights are not sharp because of the discontinuity of the dot pattern; and when printing in multicolor, there is the problem of preventing the development of moire patterns. The worst disadvantage of the halftone screen is that it obliterates approximately one half of the photographic image. Consequently only nearly perfect photographs are suitable for halftoning, and photos taken under adverse conditions cannot be printed. This limitation is particularly onerous when military reconnaissance photos mosaicked into so-called "hasty maps" cannot be printed because the halftone print is too far degraded to be of value.

Summary

The process of this invention includes registering a photographic negative and positive in back to back face relationship with the positive developed to a different density; exposing lithographic film directly through the negative-positive; developing the film and making a printing plate from the film.

An object of this invention is to simplify the lithographic reproduction process by eliminating the use of a screen to break up the tone of the negative to be reproduced.

Another object is to provide a method of reproduction in which there is no moire pattern and no regularly spaced dot pattern.

Another object is to provide a simplified lithographic reproduction process in which there is no mechanical discontinuity of the line between shadow and highlight.

Description of the preferred embodiment

The principal feature of this invention is the method by which the screen can be eliminated from the lithographic printing process.

The first step in the process is to prepare the master negative. By conventional means, attention is given to attaining the sharpest possible focus, even resolution and exposure, and proper density range. The next step is to prepare the mask positive film. This is accomplished by the conventional process of placing the master negative in emulsion-to-emulsion contact with the film positive and exposing to light. Both the master negative and masking film positive are continuous-tone.

It is important in this invention that the masking positive and master negative be developed to different densities. It has been found that good results are obtained if the masking positive is developed to approximately 80 percent of the density of the master negative. This density control can be accomplished by conventional means by one skilled in the art. Although the applicants have found that a density in the masking positive of 70–80 percent of the density of the master negative gives good results, it is to be understood that the applicants do not limit themselves to this range. Different percentages may give better results, depending on such factors as the type and intended use of the print; the condition of the copy, and the exposure time and intensity.

Figure 1:
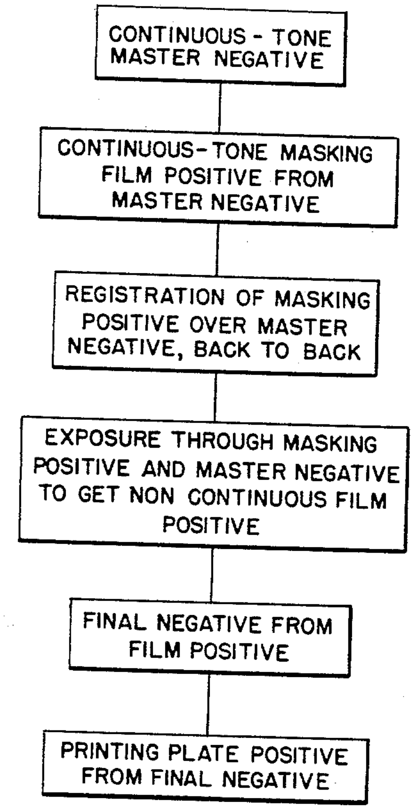
FIG. 1 is a diagrammatic illustration of various steps in the process of this invention.
Figure 2:
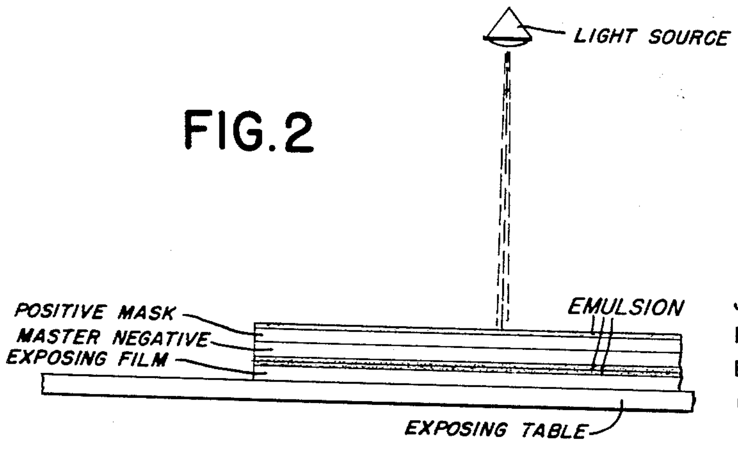
FIG. 2 is a schematic drawing of the method used to break up the continuous-tone of the negative to be reproduced.
Figure 3:
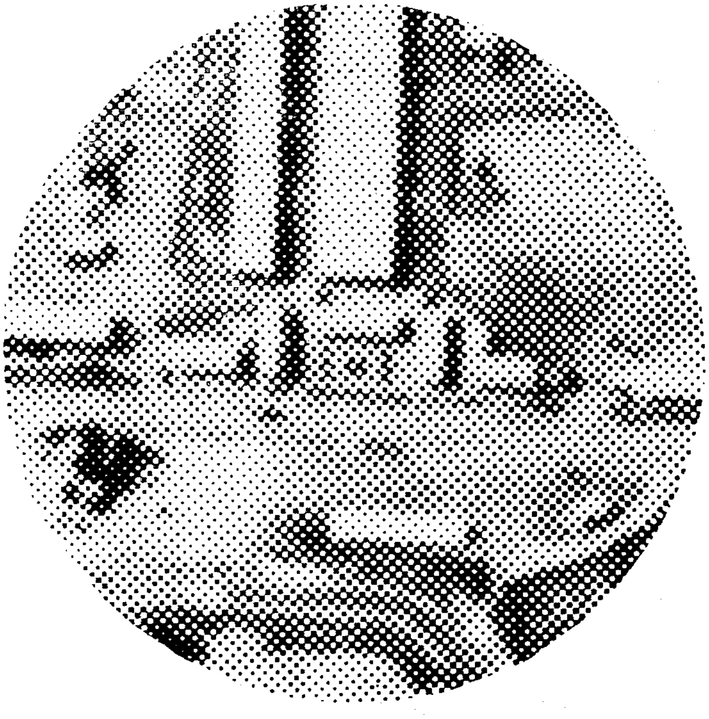
FIG.3 PRIOR ART
FIG. 3 is a photolithograph of a ten times enlargement of a view reproduced by the conventional screened halftone process.
Figure 4:
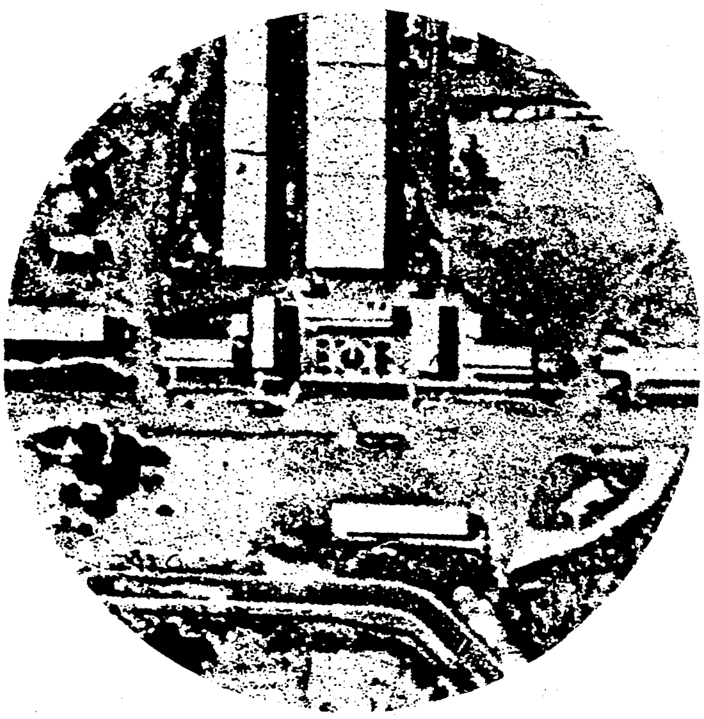
FIG. 4 is a photolithograph of the view of FIG. 3 reproduced at the same scale by the process of this invention.

The third step of this invention is to register the masking positive over the master negative. The positive and negative are exactly registered, preferably in back-to-back relation, that is, with the emulsion side of the positive facing up and the emulsion side of the negative facing down. The negative is contacted, emulsion-to-emulsion, with an unexposed film. An exposure is then made through the masking positive-master negative sandwich onto the unexposed film. This film, when developed, is a noncontinuous-tone positive. The film is positive because the less dense masking positive is over the master negative. The reason that the film is noncontinuous in tone is not absolutely clear, but it in part results from the exposing light passing through the emulsions of the sandwich films. Whatever the cause, the result of exposing through this sandwich is that what would have been the continuous tone of the exposed positive is broken up into a series of irregularly shaped and irregularly spaced fine granules. As can be seen from the ten times enlarged view of FIG. 4, the pattern of these granules gives a continuous-tone effect to the exposed positive, compared with the conventional halftone process at the same scale of the same subject matter shown in FIG. 3. The lines between shadow and highlight are much sharper and the detail of the photograph is much clearer. It has been found that this screenless method produces a discontinuity of tone sufficient for high quality lithographic reproduction and that the granules produced on the printing plates are sufficiently hard to withstand large-run production. As a result, original copy of poorer quality tonal range and sharpness may now be mechanically reproduced. It has also been found that the best quality reproduction is obtained when the exposing light is vertical to the positive-negative sandwich and when both light and exposing table are stationary. It is to be understood that the relationship between the films making up the positive-negative sandwich can be changed in varying combinations, depending on the result desired. For example, if the negative is placed over the positive, a reversed positive is obtained.

The fourth step of this invention is to make a final printing negative directly from the exposed positive by conventional means. The last step is to transfer the printing negative directly to the pressplate positive for printing. This last step is also conventional. As herein used "directly" means without the interposition of screening means. This includes the more usual exposure by contact and also includes exposure by projection.

It will be clear to those skilled in the art that the emulsion of the third film above described will be of the lithographic type because the result is a film which will properly expose a printing plate by direct exposure, without screening means. Direct exposure of a printing plate is the sole function of lithographic film emulsion. However, the conventional procedure exposes a screened image on lithographic film, either positive or negative depending on the copy from which the exposure is made. The image consists of dots of emulsion surrounded by completely cleared areas of the supporting film base. This invention resulted from the observation that a non-lithographic film exhibited the characteristics of a successfully exposed and developed lithographic film, minute clumps of emulsion defining an image and surrounded by completely cleared areas of film. The image produced by the process of this invention is infinitely superior to a screen image because it achieves the desired clumping without using a screen to obscure detail. Exposure by the unsharp masking technique, well known in the art, is essential to this invention. However, the recognition that a negative produced by unsharp masking is suitable for direct exposure of a printing plate constitutes the invention. By using the sandwich above described and a lithographic emulsion on the film to which the sandwich is exposed, the full tonal range and definition of the master negative is transferred to the lithographic film and from there to the printing negative. The printing plate is then exposed from the printing negative without screening. The use of lithographic emulsion in the printing negative is well known in the art.

It is to be understood that while the process just described has been applied to the reproduction of black and white copy, the same process can be and has been used in producing colored prints. When one is producing colored prints a series of differently colored, noncontinuous-tone film positives must be made, of course. The process of this invention is applied in obtaining each film positive. That is, the color printing process includes the step of registering a master negative and a masking positive, the negative and positive being developed to different densities, and the step of exposing through the registered films to produce a noncontinuous film positive. This invention is not concerned with the conventional color printing techniques per se, and these techniques need not be discussed here. It is deemed sufficient to point out that the process of this invention can be used in color printing without modifying standard color printing techniques to produce the same improved image as is obtained in the black and white reproduction shown by FIG. 4.

The advantages of this process are obvious. The expense and added step of using a screen are eliminated; multiple color printing can be obtained without fear of developing moire patterns from the use of screens; a mechanical appearance in the final copy is avoided; and the reproduced print is sharper in detail and contrast than the conventional halftone print.

We claim:

1. The method of preparing printing plates comprising the steps of:

(a) preparing a continuous tone master negative from the copy to be reproduced;

(b) preparing a continuous tone film positive from the master negative, said positive and negative films being so developed as to produce a difference in the densities of equal tone areas of said positive and negative;

(c) registering the film positive and master negative;

(d) exposing light through said registered positive and negative onto an unexposed film to produce a film in which the continuous tone is broken up into a pattern of irregularly shaped and spaced granules;

(e) preparing a printing negative directly from the film obtained by step (d); and (f) preparing a press-plate positive directly from the negative of step (e).

2. The method defined by claim 1 wherein said film positive of step (b) is of a lesser density than said master negative, and wherein said film positive is registered on top of said master negative in step (c) in back-to-back relationship with respect to the emulsions of the films.

3. The method defined by claim 2, wherein the density of said film positive of step (b) is developed to approximately 80 percent of the density of said master negative.

4. The method defined by claim 2, wherein the exposing light of step (d) is vertically above said registered positive and negative, and wherein said light source and the exposing table are stationary.

5. The method of preparing a press plate for the mechanical reproduction of a continuous tone photographic record, comprising the steps of:

(a) preparing a continuous tone film negative of said record;

(b) preparing a continuous tone film positive from said negative to a different density than that of said negative;

(c) registering said film negative and positive with their emulsion sides facing outward;

(d) exposing an unexposed lithographic film with light passing through said registered films;

(e) developing said lithographic film to produce an image thereon having the appearance of the full tonal range and resolution of said continuous tone films, said image being constituted of irregularly shaped and spaced black granules surrounded by completely cleared areas of film base;

(f) preparing a lithographic film negative directly from the film of step (e);

(g) preparing a press plate from the negative of step (e) by direct exposure of said negative to the plate; and (h) developing said plate.

References Cited

UNITED STATES PATETNS

| | | | |
|---|---|---|---|
| 1,356,442 | 10/1920 | Garbutt | 96—44 |
| 2,455,849 | 12/1948 | Yule | 96—44 |

NORMAN G. TORCHIN, *Primary Examiner.*

R. E. MARTIN, *Assistant Examiner.*